US009264564B1

(12) United States Patent
Suzuki

(10) Patent No.: US 9,264,564 B1
(45) Date of Patent: Feb. 16, 2016

(54) PRINTING DATA COLLECTION AND DISTRIBUTION SERVER, PRINTING DATA COLLECTION AND DISTRIBUTION METHOD AND COMPUTER-READABLE MEDIUM RECORDED WITH PRINTING DATA COLLECTION AND DISTRIBUTION PROGRAM

(71) Applicants: KABUSHIKI KAISHA TOSHIBA, Tokyo (JP); TOSHIBA TEC KABUSHIKI KAISHA, Tokyo (JP)

(72) Inventor: Katsunori Suzuki, Mishima Shizuoka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 14/617,717

(22) Filed: Feb. 9, 2015

(51) Int. Cl.
H04N 1/00 (2006.01)
H04N 1/21 (2006.01)
H04N 1/32 (2006.01)
G06F 3/12 (2006.01)
G06K 15/02 (2006.01)
G06K 15/14 (2006.01)
G06K 15/00 (2006.01)

(52) U.S. Cl.
CPC ............ *H04N 1/00896* (2013.01); *G06K 15/14* (2013.01); *G06K 15/406* (2013.01); *H04N 1/00204* (2013.01); *H04N 1/00307* (2013.01); *H04N 1/00928* (2013.01); *H04N 1/00933* (2013.01); *H04N 1/00954* (2013.01); *H04N 1/21* (2013.01); *H04N 1/32523* (2013.01); *H04N 2201/0094* (2013.01)

(58) Field of Classification Search
None
See application file for complete search history.

(56) References Cited

U.S. PATENT DOCUMENTS

| 6,268,925 | B1* | 7/2001 | Yamanaka | 358/1.14 |
| 6,493,100 | B1* | 12/2002 | Endo et al. | 358/1.14 |
| 7,242,491 | B2* | 7/2007 | Nakayasu et al. | 358/1.15 |
| 2005/0019077 | A1* | 1/2005 | Hatta et al. | 400/62 |
| 2006/0191435 | A1* | 8/2006 | Fujihara | 101/484 |
| 2008/0180704 | A1* | 7/2008 | Kametani | 358/1.9 |
| 2008/0186524 | A1* | 8/2008 | Morimoto | G03G 15/5004 358/1.13 |
| 2010/0177340 | A1* | 7/2010 | Huster et al. | 358/1.15 |
| 2010/0188698 | A1* | 7/2010 | Koizumi | 358/1.15 |
| 2011/0310428 | A1* | 12/2011 | Ciriza | G06F 1/3203 358/1.15 |
| 2012/0200888 | A1* | 8/2012 | Kato | 358/1.15 |
| 2013/0057883 | A1* | 3/2013 | Ohshima et al. | 358/1.9 |
| 2014/0075228 | A1* | 3/2014 | Oyama | G06F 1/329 713/323 |
| 2014/0235282 | A1* | 8/2014 | Kansal et al. | 455/466 |

FOREIGN PATENT DOCUMENTS

JP 2011-070537 * 4/2011 ............... G06F 3/12

* cited by examiner

*Primary Examiner* — Beniyam Menberu
(74) *Attorney, Agent, or Firm* — Patterson & Sheridan, LLP

(57) ABSTRACT

A printing data collection and distribution server comprises a storage unit in which printing data sent from an information terminal is stored, a data distribution unit configured to distribute the printing data stored in the storage unit to a distribution request destination, a designation unit configured to designate an image forming apparatus as the distribution request destination, and a control unit configured to output, when the printing data is received from the information terminal, to the image forming apparatus, a resume-from-sleep command signal instructing the image forming apparatus to transition from a sleep mode to a standby mode.

17 Claims, 5 Drawing Sheets

FIG.5

| MFP LIST OF USER-1 | NORMALLY USED MFP | RECEPTION OF RESUME-FROM-SLEEP COMMAND SIGNAL |
|---|---|---|
| MFP-1 | Yes | Yes |
| MFP-2 | Yes | No |
| MFP-N | No | No |

113

PRINTING DATA COLLECTION AND DISTRIBUTION SERVER, PRINTING DATA COLLECTION AND DISTRIBUTION METHOD AND COMPUTER-READABLE MEDIUM RECORDED WITH PRINTING DATA COLLECTION AND DISTRIBUTION PROGRAM

FIELD

Embodiments described herein relate generally to a technology for cancelling a sleep mode of an image forming apparatus by a printing data collection and distribution server.

BACKGROUND

An on-demand printing system for an information terminal such as a PC, a smart phone, a tablet and the like, includes an image forming apparatus and a server that are connected with each other through a network. The system temporarily collects printing data sent from the information terminal in the server, and a user instructs, from a given image forming apparatus, to retrieve the printing data stored in the server to execute printing.

An electrophotographic type image forming apparatus that heats a toner image transferred to an image receiving medium such as a printing sheet and the like by a fixing device to fix the toner image on the image receiving medium, may be used as an image forming apparatus. If no operation is carried out during a given time, the image forming apparatus transitions into a sleep mode from a standby mode, which corresponds to a print-ready state. The image forming apparatus transitions into the sleep mode to cut off the power supplied to the part that is not needed to save power. The image forming apparatus in the sleep mode needs to be resumed from the sleep mode to the standby mode to execute a next print job.

When such an image forming apparatus is connected to a network, a user has to move to the image forming apparatus and look at a display screen of the image forming apparatus to confirm whether the image forming apparatus is in the standby mode or the sleep mode. If the image forming apparatus is in the sleep mode, the user needs to press an operation button to cancel the sleep mode and transition the image forming apparatus into the standby mode.

That is, when the user moves to the image forming apparatus to execute printing and selects printing data to be retrieved from the server for printing from options displayed in the display screen, the image forming apparatus is resumed from the sleep mode to the standby mode.

The image forming apparatus that receives the operation of the user is resumed from the sleep mode to the standby mode. However, the image forming apparatus will require a certain amount of time before transitioning from the sleep mode to the standby mode; thus, the user has to wait for the start of printing in front of the image forming apparatus.

BRIEF DESCRIPTION OF THE DRAWINGS

FIG. 5 is a diagram illustrating a display screen for displaying various arrangements.

DETAILED DESCRIPTION

In accordance with one embodiment, a printing data collection and distribution server comprises a storage unit in which printing data sent from an information terminal is stored, a data distribution unit configured to distribute the printing data stored in the storage unit to a distribution request destination, a designation unit configured to designate an image forming apparatus to be used as the distribution request destination, and a control unit configured to output, when the printing data is received from the information terminal, to the image forming apparatus, a resume-from-sleep command signal instructing the image forming apparatus to transition from a sleep mode to a standby mode.

Hereinafter, the printing data collection and distribution server according to the present embodiment is described in detail with reference to the accompanying drawings.

Figure 1:
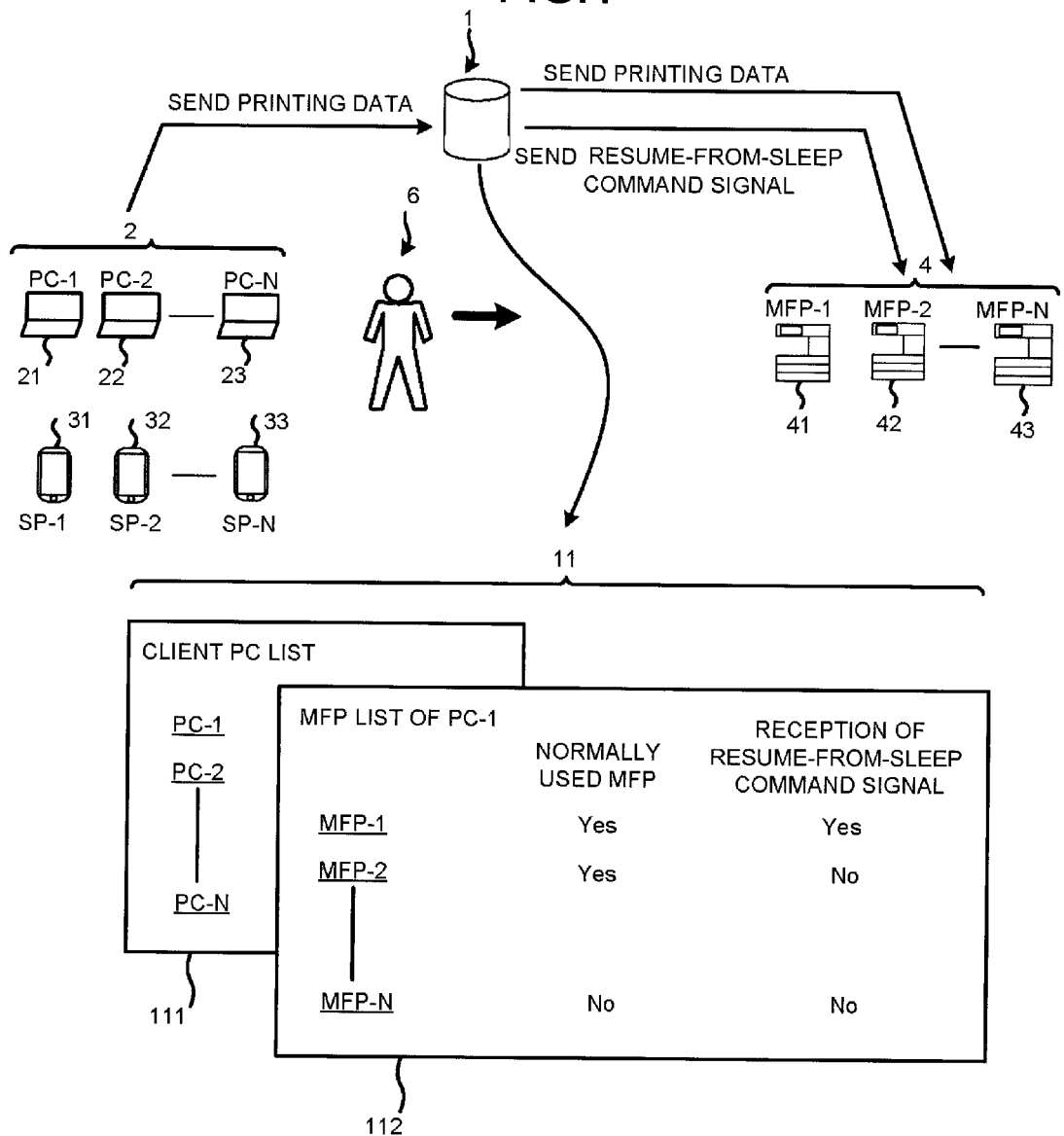
FIG. 1 is a diagram illustrating a printing system employing a server according to a first embodiment.
Figure 2:
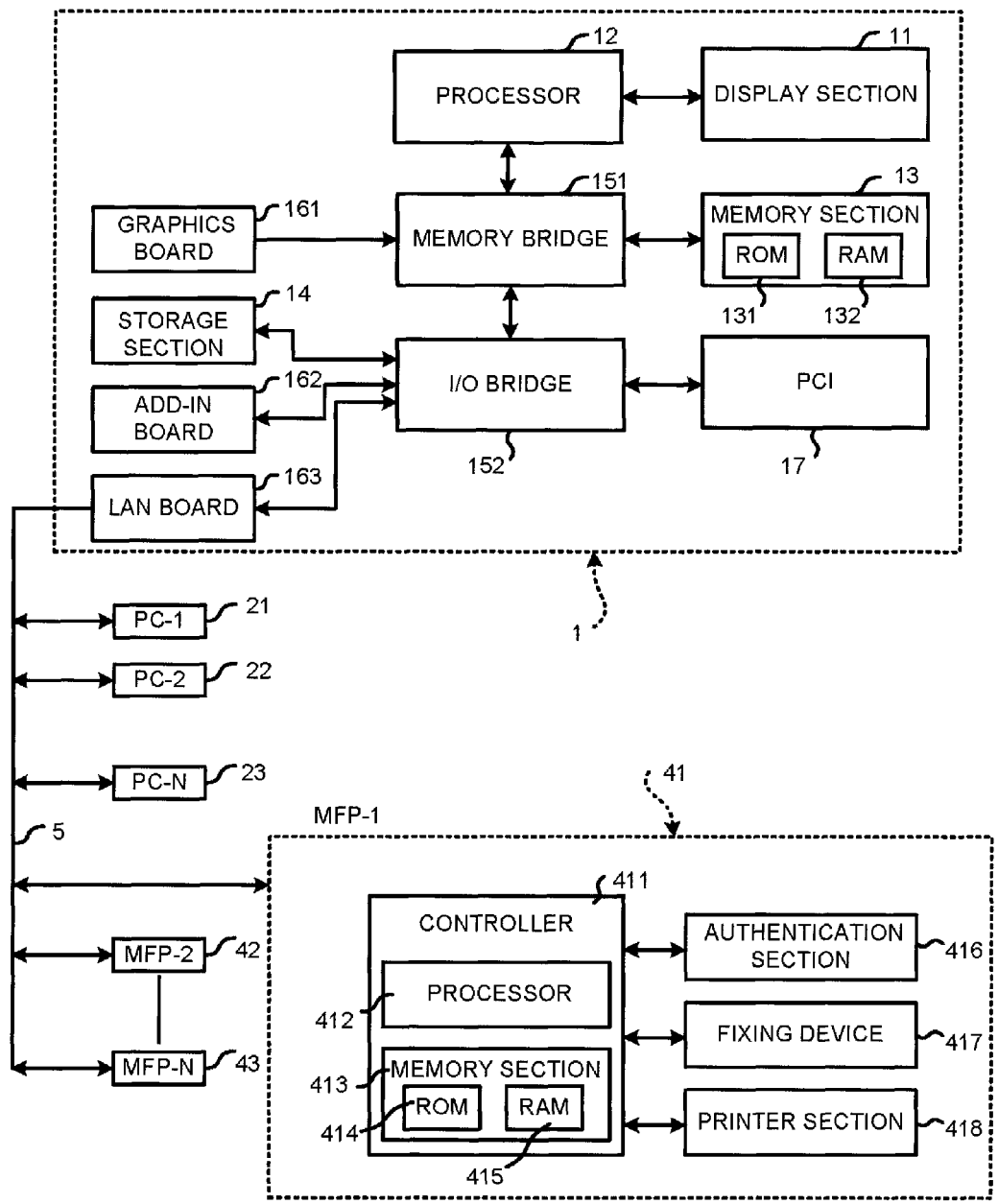
FIG. 2 is a block diagram illustrating the server shown in FIG. 1.

As shown in FIG. 1 and FIG. 2, the printing system includes a server 1, an information terminal group 2, an image forming apparatus group 4 and a network 5. The network 5 connects the information terminal group 2 and the image forming apparatus group 4 with the server 1 in a wired or wireless manner.

The information terminal group 2 includes a plurality of (N) personal computers (PC-1, PC-2 . . . PC-N) 21-23 and a plurality of (N) smart phones (SP-1, SP-2 . . . SP-N) 31-33.

The image forming apparatus group 4 includes a plurality of image forming apparatuses (MFP-1, MFP-2 . . . MFP-N) 41-43. The image forming apparatuses 41-43 may be, for example, electrophotographic type MFPs (Multi-Function Peripherals).

As shown in FIG. 2, the server 1 includes a display section 11, a processor 12, a memory section 13, a storage section 14, a PCI slot 17, a memory bridge 151, an I/O bridge 152, a graphics board 161, an add-in board 162, a LAN board 163 and the like. The server 1 may be installed in either an on-premises environment or a public environment.

The processor 12 and the memory section 13 connected with each other through the memory bridge 151 constitute a controller. The I/O bridge 152 is connected with the storage section 14, the add-in board 162, the LAN board 163 and the PCI slot 17.

The processor 12 includes, for example, a CPU (Central Processing Unit) or a MPU (Micro Processing Unit). The memory section 13, which is, for example, a semiconductor memory, includes a ROM (Read Only Memory) 131 for storing various control programs and a RAM (Random Access Memory) 132 for providing a temporary work area for the processor 12. For example, the ROM 131 stores a program for sending, to a specific image forming apparatus (hereinafter referred to as MFP), a resume-from-sleep command signal that instructs to resume from a sleep mode to a standby mode.

The storage section 14 stores printing data sent from the information terminal group 2.

The RAM 132 temporarily stores a unique number (PC-1, PC-2, PC-3, SP-1, SP-2 and SP-3) of each registered terminal of the information terminal group 2, a unique number (MFP-1, MFP-2 and MFP-3) of each MFP of the image forming apparatus group 4 and an individual title name for identifying the printing data stored in the storage section 14.

The processor 12 outputs a resume-from-sleep command signal to the LAN board 163 through the memory bridge 151 and the I/O bridge 152. Then the resume-from-sleep command signal is sent to the specific MFP through the network 5 connected with the LAN board 163.

The processor 12 registers the personal computers, smart phones and the like individually used by users in a table (not shown) of the RAM 132 as a client PC list. The processor 12 further registers information indicating whether or not the normally used MFP is designated by, for example, a user 6 of the PC-1 and information indicating whether or not the resume-from-sleep command signal is sent for each MFP in the table (not shown) of the RAM 132, respectively.

The client PC list, the information indicating whether or not the normally used MFP is designated and the information indicating whether or not the resume-from-sleep command signal is sent to each MFP are set and registered in the server 1 in advance by a system administrator or a user.

As shown in FIG. 1, the display section 11 includes a client PC list display screen 111 for displaying the client PC list of the information terminal group 2 stored in the RAM 132 and a MFP list display screen 112 for displaying the arrangements between the information terminal and each MFP.

The client PC list display screen 111 displays registration numbers (PC-1, PC-2 . . . PC-N) of the registered personal computers. The MFP list display screen 112 displays, for example, that the user 6 of the personal computer 21 having a registration number PC-1 selects (Yes) the MFP-1 and the MFP-2 as the normally used MFP, and that the MFP-N is not normally used (No). The MFP list display screen 112 further displays settings indicating whether or not the resume-from-sleep command signal is sent, and in this example, the resume-from-sleep command signal is sent to the MFP-1 (Yes) and is not sent to the MFP-2 and the MFP-N (No).

The mode for designating the MFP corresponding to the information terminal further includes a mode for pre-designating the MFP according to use frequency based on use history and a mode for pre-designating the recently used MFP through a learning function, in addition to the mode in which the MFP is pre-designated by the user.

In this way, the server 1 can designate the MFP to be used as a printing destination.

The MFP transitions into a sleep mode from a standby mode after the printing operation is terminated. The server 1 can set, for each MFP, a time required to transition the MFP from the standby mode into the sleep mode The server 1 further has a scheduling function and a learning function. The scheduling function blocks the output of the resume-from-sleep command signal on a specific date (such as Saturday, Sunday, holiday and the like) and during a specific time period (such as midnight and the like). The learning function records a time (print-start elapsed time) taken from the moment the server 1 received the printing data to the moment the printing started during the previous printing. The print-start elapsed time is contained in a return-to-sleep command that is sent to the MFP simultaneously with the resume-from-sleep command signal. After receiving the print-start elapsed time, the MFP transitions into the sleep mode if the next printing data is not received within a predetermined time (e.g., 5 minutes) after the print-start elapsed time elapses.

The server 1 collects and stores the printing data sent from the information terminal group 2. The server 1 sends the stored printing data to the MFP that requests the distribution of printing data. The server 1 further sends the individual title name of the stored printing data to the MFP that requests the distribution of individual title name. The user 6 designates the individual title name of the printing data and then prints the printing data. The MFP can further carry out authentication through an authentication section 416. In this case, it is possible to display only the individual title name of the printing data relating to the user authenticated by the authentication section 416 on the MFP.

In the present embodiment, the server 1 sends the resume-from-sleep command signal to the MFP after receiving the printing data from the information terminal group 2. Upon receiving the resume-from-sleep command signal, the MFP starts an operation of resuming from the sleep mode to the standby mode, so that the MFP is in the standby mode before the user 6 arrives at the MFP to carry out the desired printing operation.

Thus, if the user 6 operates the personal computer at a position away from the MFP to send the printing data to the server 1, the resume-from-sleep command signal is sent to a specific MFP that is expected to be used, and the MFP starts an operation of resuming from the sleep mode to the standby mode.

One example of the hardware constitution of a MFP 41 is shown in FIG. 2. The MFP 41, which is an electrophotographic type image forming apparatus, is provided with a controller 411, the authentication section 416, a fixing device 417, a printer section 418, a storage section (not shown) for temporarily storing printing data (not shown) and the like.

The controller 411 includes a processor 412 for controlling the entire MFP and a memory section 413. The processor 411 includes, for example, a CPU (Central Processing Unit) or a MPU (Micro Processing Unit). The memory section 413, which is, for example, a semiconductor memory, includes a ROM (Read Only Memory) 414 for storing various control programs and a RAM (Random Access Memory) 415 for providing a temporary work area for the processor 412. For example, the ROM 414 stores a program for carrying out an operation of resuming the MFP from the sleep mode to the standby mode and an opposite operation of returning the MFP from the standby mode to the sleep mode. If the resume-from-sleep command signal is received from the server 1, the operation of resuming from sleep is started. Further, if the return-to-sleep command signal is received from the server 1, the print-start elapsed time is set in the MFP.

As for the operation of resuming from sleep, first, a heater of the fixing device 417 is energized to raise the surface temperature of a heating roller of the fixing device 417 to a fixing temperature.

The authentication section 416 reads an ID card and the like of the user 6. If the controller 411 confirms that it is the user 6, it is determined that the user 6 has selected this MFP for use. A list of individual title names stored in the server 1 is displayed to the user 6 on a display section (not shown) of the MFP. If the user 6 selects the individual title name corresponding to the printing data desired to be printed and presses a start button (not shown), the server 1 sends the printing data corresponding to the selected individual title name to the MFP. At this time, the MFP is already in the standby mode; thus, the image forming operation by the printer section 418 is started immediately, and a toner image transferred to the sheet is heated and pressed by the fixing device 417, whereby the image is fixed on the sheet.

Next, the flow of sending the resume-from-sleep command signal carried out in the server 1 is described with reference to the flowchart shown in FIG. 3.

If the printing data is received from the information terminal of the information terminal group 2 in ACT 1, ACT 2 is executed.

In ACT 2, it is determined whether or not the normally used MFP is designated. As shown in the display screen 112 in FIG. 1, if there is a normally used MFP (YES in ACT 2), ACT 3 is executed; otherwise (NO in ACT 2), the resume-from-sleep command signal is not sent, and therefore, the processing is ended.

In ACT 3, it is determined whether or not the sending of the resume-from-sleep command signal to the normally used MFP is designated. If the sending of the resume-from-sleep command signal is designated (YES in ACT 3), ACT 4 is executed; on the contrary, if the sending of the resume-from-sleep command signal is not designated (NO in ACT 3), the processing is ended.

In ACT 4, the resume-from-sleep command signal is sent, and then ACT 5 is executed. In the display screen 112 shown in FIG. 1, the normally used MFP includes the MFP-1 and the MFP-2, and the MFP that receives the resume-from-sleep command signal is designated as the MFP-1. As a result, the MFP-1 starts the operation of resuming from sleep before waiting for the reception of the operation of the user 6. Thus, when the user 6 of the personal computer PC-1 moves to the MFP-1, the MFP-1 is already in the standby mode. Therefore, if the user 6 selects the individual title name, the printing data corresponding to the selected individual title name is sent to the MFP-1, and if the user 6 presses a copy button, the printing operation is started.

In ACT 5, the return-to-sleep command signal is sent and the processing is ended. The return-to-sleep command signal contains a time from the moment the resume-from-sleep command is sent to the moment the printing data is sent, that is, the time from the moment the server 1 receives the printing data to the moment the printing is started in the previous printing. Thus, in a case in which the foregoing time is longer than the general time taken until the MFP returns to the sleep mode, new printing can be executed without waiting. Further, the command can be validated or invalidated.

Next, the flow of the processing carried out between the server 1 and the MFP is described with reference to the flowchart shown in FIG. 4.

In ACT 11, the server 1 determines whether or not there is a request of the list of the individual title names of the printing data from the MFP. If there is a request of the list of the individual title names (YES in ACT 11), ACT 12 is executed. On the contrary, if there is no request of the list of the individual title names (NO in ACT 11), the printing data cannot be designated, thus, the processing is ended.

In ACT 13, it is determined whether or not there is a distribution request of the printing data corresponding to the individual title name selected from the individual title name list. If there is a distribution request of the printing data (YES in ACT 13), ACT 14 is executed. On the other hand, if there is no distribution request of the printing data, the processing is ended.

In ACT 14, a printing data distribution section distributes the printing data the distribution of which is requested to the MFP that requests the printing data, and then the processing is ended.

(Modification)

Though it is exemplified in the embodiment described above that the MFP used corresponding to the information terminal that sends the printing data is designated, in the modification, the MFP used corresponding to the user who sends the printing data is designated. Hereinafter, the part different from that described in the embodiment stated above is mainly described, while the same part is not described repeatedly.

In the embodiment described above, the client PC list, the information indicating whether or not the normally used MFP is designated, and the information indicating whether or not the resume-from-sleep command signal is sent to each MFP are registered in the table (not shown) of the RAM 132; however, in the modification, the processor 12 registers the user ID for specifying the user using the information terminal and the normally used MFP corresponding to the user ID in the table (not shown) of the RAM 132 in advance. When the user sends the printing data from the information terminal, the resume-from-sleep command signal is also sent to the image forming apparatus pre-registered corresponding to the user ID for specifying the sender sent together with the printing data.

FIG. 5 is a diagram illustrating a MFP list display screen 113 of the display section 11 in the modification. It is displayed in the MFP list display screen 113 that the MFP-1 and the MFP-2 are selected (Yes) as the MFP normally used by, for example, a user having a user ID of User-1, while the MFP-N is not normally used (No). The MFP list display screen 113 further displays settings indicating whether or not the resume-from-sleep command signal is sent, and in this example, the resume-from-sleep command signal is sent to the MFP-1 (Yes) and is not sent to the MFP-2 and the MFP-N(No).

Figure 3:
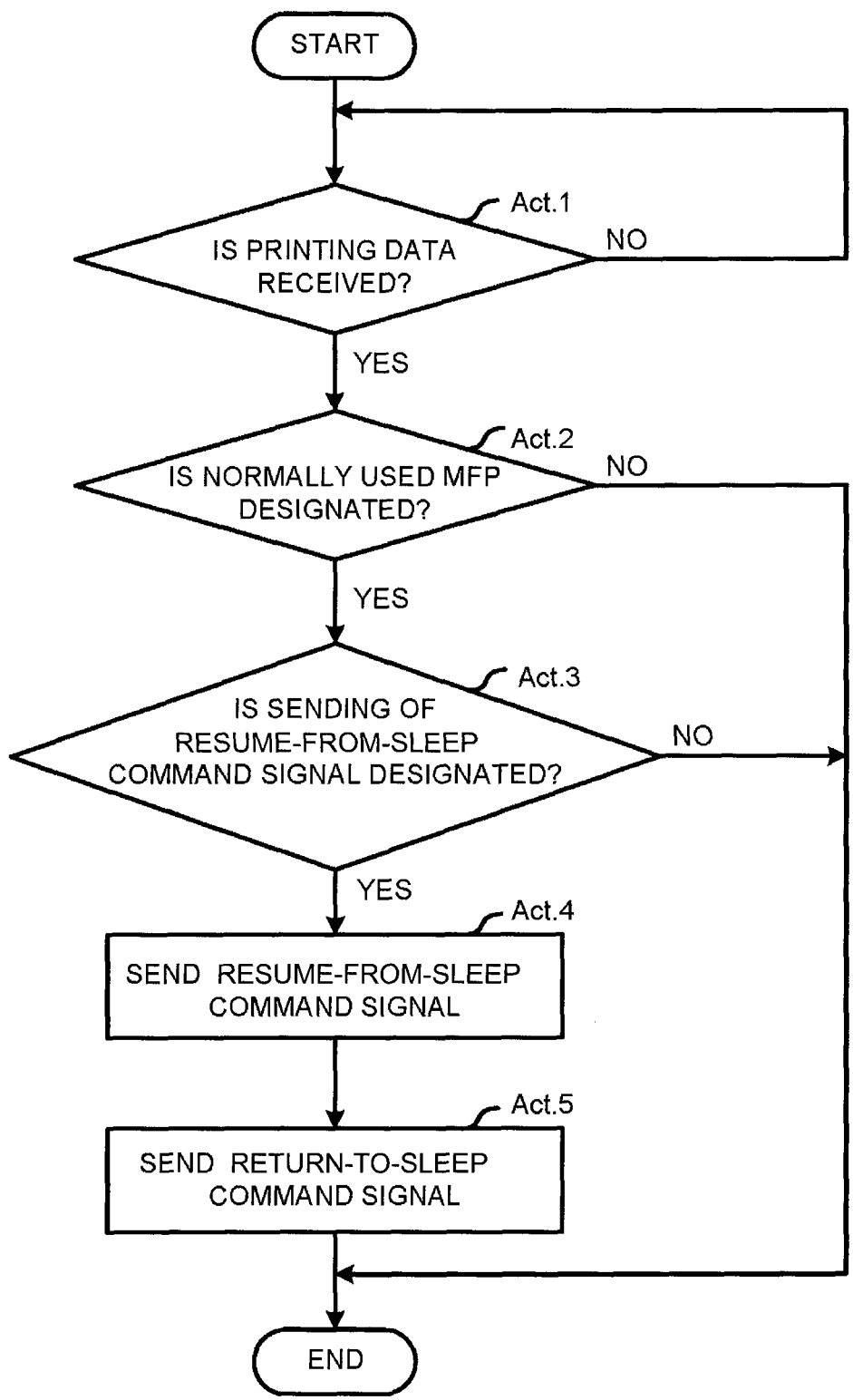
FIG. 3 is a flowchart illustrating a method of resuming from sleep performed by the server shown in FIG. 2.

The flow of sending the resume-from-sleep command signal carried out in the server 1 is the same as that described in the flowchart shown in FIG. 3, and in the modification, the content of the table referred to in ACT 2 is changed to the content shown in FIG. 5.

In this way, the MFP to be used as the distribution destination can also be designated in advance even in the modification.

Figure 4:
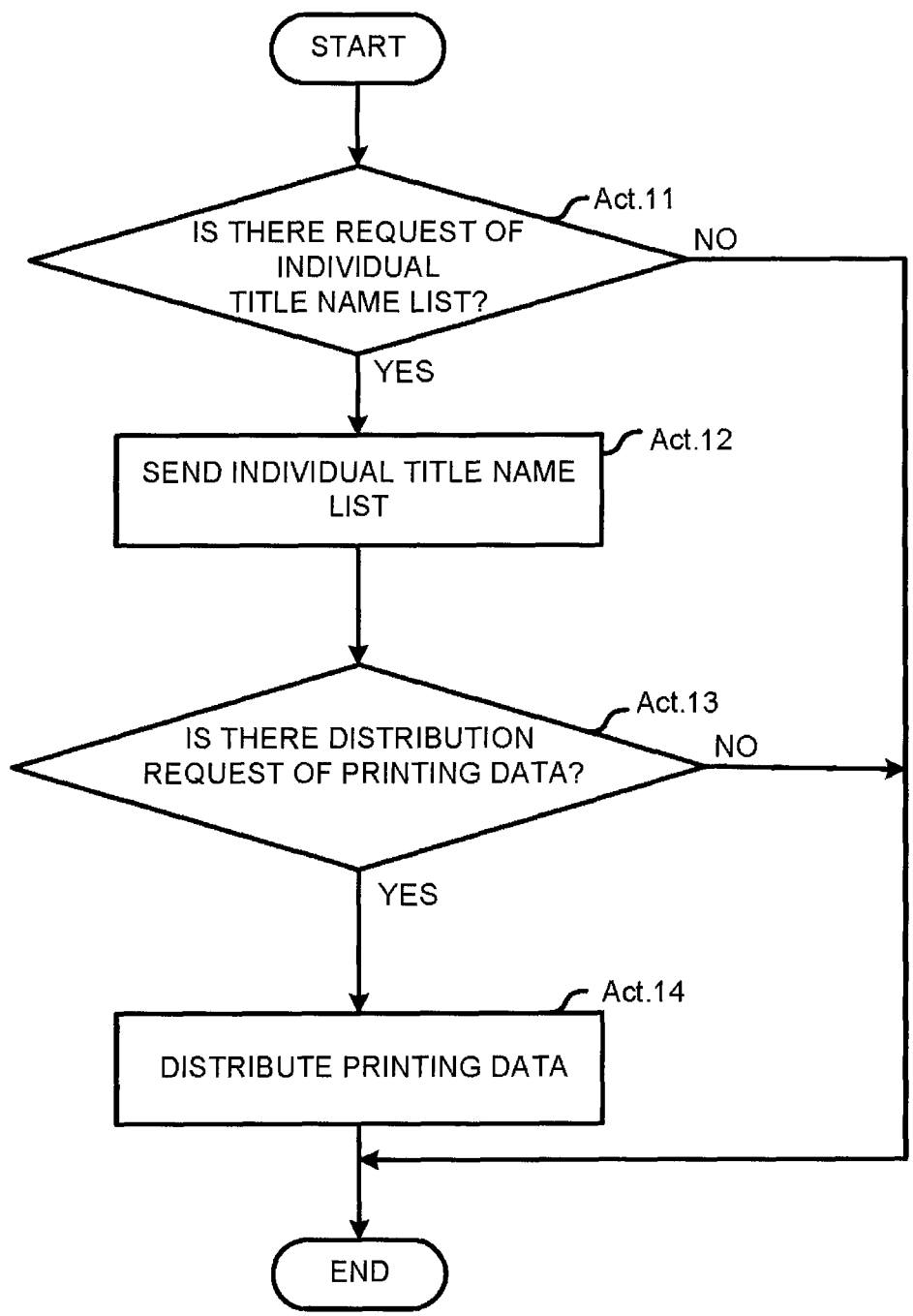
FIG. 4 is a flowchart illustrating a method of sending printing data between the server and an image forming apparatus.

In the present embodiment, the processing described in FIG. 3 and FIG. 4 is achieved by executing programs prerecorded in a storage area arranged in the server 1 by a processor for internal data processing. However, the present invention is not limited to this. The programs may be downloaded to the server 1 from a network, and alternatively, the programs may be stored in a computer-readable recording medium and the recording medium is installed in the server 1. No specific limitation is given to the recording medium as long as the recording medium can store programs and is readable by a computer. For example, an RAM (Random Access Memory), an ROM (Read Only Memory), a DRAM, an SRAM (Static Random Access Memory), a VRAM (Video RAM), a flash memory can be used as the recording medium.

Further, although the information indicating whether or not the resume-from-sleep command signal is sent to each MFP is set through the display section 11 of the server 1, the present invention is not limited to this. For example, the user may access a Web server of the server 1 using a browser of the information terminal such as an external PC or a smart phone and the like to set the information indicating whether or not the resume-from-sleep command signal is sent.

While certain embodiments have been described, these embodiments have been presented by way of example only, and are not intended to limit the scope of the invention. Indeed, the novel embodiments described herein may be embodied in a variety of other forms; furthermore, various omissions, improvements, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printing data collection and distribution server, comprising:

a storage unit in which printing data sent from an information terminal is stored;

a data distribution unit configured to distribute the printing data stored in the storage unit to a distribution request destination;

a designation unit configured to designate an image forming apparatus to be used as the distribution request destination; and a control unit configured to output, when the printing data is received from the information terminal, to the image forming apparatus, a resume-from-sleep command signal instructing the image forming apparatus to transition from a sleep mode to a standby mode, wherein the control unit is further configured to send to the image forming apparatus a return-to-sleep command signal containing a print-start elapsed time, based on which the image forming apparatus starts a next sleep mode, the print-start elapsed time being representative of the amount of time elapsed during a previous printing from the moment the printing data is received to the moment the printing is started.

2. The printing data collection and distribution server according to claim 1, wherein the designation unit designates an image forming apparatus to be used as the distribution request destination for each information terminal from which the printing data is sent.

3. The printing data collection and distribution server according to claim 1, wherein the control section designates, after outputting a resume-from-sleep command signal, a time to start a next sleep mode for the image forming apparatus.

4. The printing data collection and distribution server according to claim 1, wherein the control unit has a scheduling function configured to establish time periods during which the resume-from-sleep command signal is disabled from being issued.

5. The printing data collection and distribution server according to claim 1, wherein the image forming apparatus starts the next sleep mode a predetermined amount of time after the print-start elapsed time has elapsed.

6. The printing data collection and distribution server according to claim 1, wherein the designation is configured to operate in a first mode in which the image forming apparatus is designated manually by a user, a second mode in which the image forming apparatus is designated automatically according to use frequency based on use history, and a third mode in which the image forming apparatus is designated automatically through a learning function.

7. A printing data collection and distribution server, comprising:

a storage unit; and a control unit configured to store printing data sent from an information terminal in the storage unit and distribute the printing data to an image forming apparatus for printing along with a resume-from-sleep command signal instructing the image forming apparatus to transition from a sleep mode to a standby mode, wherein the control unit is further configured to send to the image forming apparatus a return-to-sleep command signal containing a print-start elapsed time, based on which the image forming apparatus starts a next sleep mode, the print-start elapsed time being representative of the amount of time elapsed during a previous printing from the moment the printing data is received to the moment the printing is started.

8. The printing data collection and distribution server according to claim 7, wherein the control unit is configured to select the image forming apparatus to which the printing data is distributed based on data that relates the image forming apparatus and the user ID associated with the printing data.

9. The printing data collection and distribution server according to claim 8, wherein the data is generated automatically based on use history or through a learning function.

10. The printing data collection and distribution server according to claim 7, wherein the control section designates, after outputting a resume-from-sleep command signal, a time to start a next sleep mode for the image forming apparatus.

11. The printing data collection and distribution server according to claim 7, wherein the control unit has a scheduling function configured to establish time periods during which the resume-from-sleep command signal is disabled from being issued.

12. The printing data collection and distribution server according to claim 7, wherein the image forming apparatus starts the next sleep mode a predetermined amount of time after the print-start elapsed time has elapsed.

13. A printing data collection and distribution method, including:

storing printing data received from an information terminal;

outputting, to a pre-designated image forming apparatus, a resume-from-sleep command signal instructing the image forming apparatus to transition from a sleep mode to a standby mode;

distributing the printing data to the image forming apparatus in response to a request from the image forming apparatus for the printing data; and sending to the image forming apparatus a return-to-sleep command signal containing a print-start elapsed time, based on which the image forming apparatus starts a next sleep mode, the print-start elapsed time being representative of the amount of time elapsed during a previous printing from the moment the printing data is received to the moment the printing is started.

14. The printing data collection and distribution method according to claim 13, further comprising:

identifying the pre-designated image forming apparatus based on data that relates image forming apparatuses and user IDs.

15. The printing data collection and distribution method according to claim 13, further comprising:

after outputting the resume-from-sleep command signal, designating a time to start a next sleep mode for the image forming apparatus.

16. The printing data collection and distribution method according to claim 13, further comprising:

establishing time periods during which the resume-from-sleep command signal is disabled from being issued.

17. The printing data collection and distribution method according to claim 13, wherein the image forming apparatus starts the next sleep mode a predetermined amount of time after the print-start elapsed time has elapsed.

* * * * *